United States Patent [19]

Linde

[11] Patent Number: 4,619,405

[45] Date of Patent: Oct. 28, 1986

[54] AUGER HOLD DOWN MECHANISM FOR MANURE SPREADERS

[75] Inventor: Gilbert W. Linde, Oxford, Pa.

[73] Assignee: New Holland Inc., New Holland, Pa.

[21] Appl. No.: 629,919

[22] Filed: Jul. 11, 1984

[51] Int. Cl.[4] .............................................. A01C 19/00
[52] U.S. Cl. .................................................... 239/675
[58] Field of Search ....................... 239/672, 675, 650;
280/670; 198/311, 672; 222/233, 168, 609, 626;
406/53; 92/132, 146

[56] References Cited

U.S. PATENT DOCUMENTS

| | | | |
|---|---|---|---|
| 2,799,510 | 7/1957 | Schmidt | 239/672 X |
| 2,967,056 | 1/1961 | D'Amato | 239/650 |
| 3,019,025 | 1/1962 | Young | 239/675 X |
| 3,121,568 | 2/1964 | Wilkes et al. | 239/658 X |
| 3,423,030 | 1/1969 | Ayranto | 239/686 |
| 3,765,526 | 10/1973 | Hubbard et al. | 198/672 |
| 4,117,920 | 10/1978 | Oury | 198/311 |
| 4,400,008 | 8/1983 | Rumpel | 280/670 X |
| 4,467,967 | 8/1984 | Martin | 239/675 X |

FOREIGN PATENT DOCUMENTS

| | | | |
|---|---|---|---|
| 2010109 | 6/1979 | United Kingdom | 222/626 |
| 2014835 | 9/1979 | United Kingdom | |

Primary Examiner—Joseph F. Peters, Jr.
Assistant Examiner—Patrick N. Burkhart
Attorney, Agent, or Firm—Darrell F. Marquette; Frank A. Seemar; Larry W. Miller

[57] ABSTRACT

A slurry type manure spreader having an auger rotatably mounted in a tank and power devices such as hydraulic cylinders for raising the auger in the tank. Resilient devices such as springs are connected to the ends of the auger to urge the auger downwardly in the tank. The auger may move upwardly in the tank by itself independently of the power devices while being constantly urged downwardly by the resilient devices.

4 Claims, 3 Drawing Figures

AUGER HOLD DOWN MECHANISM FOR MANURE SPREADERS

CROSS REFERENCE TO RELATED APPLICATION

This application is related to U.S. application Ser. No. 340,441 filed Jan. 18, 1982.

BACKGROUND AND SUMMARY OF THE INVENTION

Manure spreaders of the slurry type generally include a tank for containing manure with an auger rotatably mounted in the bottom of the tank for moving manure toward an opening formed in a sidewall of the tank. An expeller is disposed at the opening in the sidewall of the tank to discharge manure in a generally lateral direction from the spreader.

Power devices such as hydraulic cylinders have been provided in slurry type manure spreaders for raising the auger in the tank to break up manure that bridges above the auger and to break the auger out of manure that is frozen in the bottom of the tank. In one prior slurry spreader, hydraulic cylinders were utilized for raising the auger but not for lowering it, and the auger was permitted to move upward by itself independently of the hydraulic cylinders to clear obstructions such as rocks which become lodged between the auger and the bottom wall and the sidewalls of the tank. A problem existed with this one prior slurry spreader in that whenever the auger moved upward by itself independently of the hydraulic cylinders, the auger often would not return to its normal position in the tank quickly enough to keep a steady flow of manure moving toward the expeller. Another problem was that the auger, due to its natural buoyancy, tended to float upward at inappropriate times.

The present invention overcomes this problem by providing resilient means for constantly urging the auger downwardly in the tank. The resilient means is designed to allow the auger to be raised by power devices or to move upward by itself independently of the power devices. The resilient means acts to quickly return the auger to its normal position after being raised by the power devices or after moving upward by itself. In the preferred embodiment of the present invention, the resilient means comprises springs connected to the auger.

DESCRIPTION OF THE PREFERRED EMBODIMENT

Figure 1:
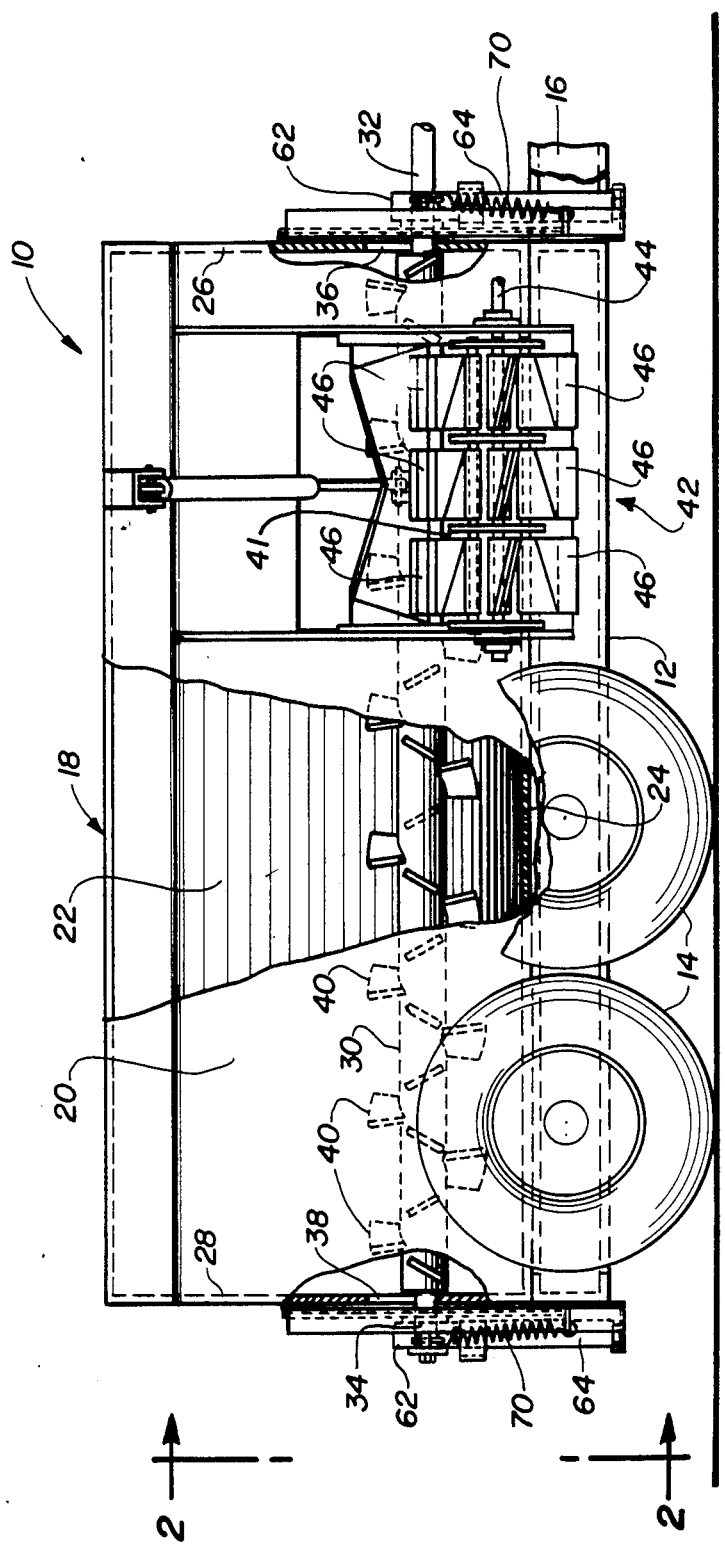
FIG. 1 is a side elevational view, with portions broken away, of a manure spreader incorporating the preferred embodiment of the present invention.
Figure 2:
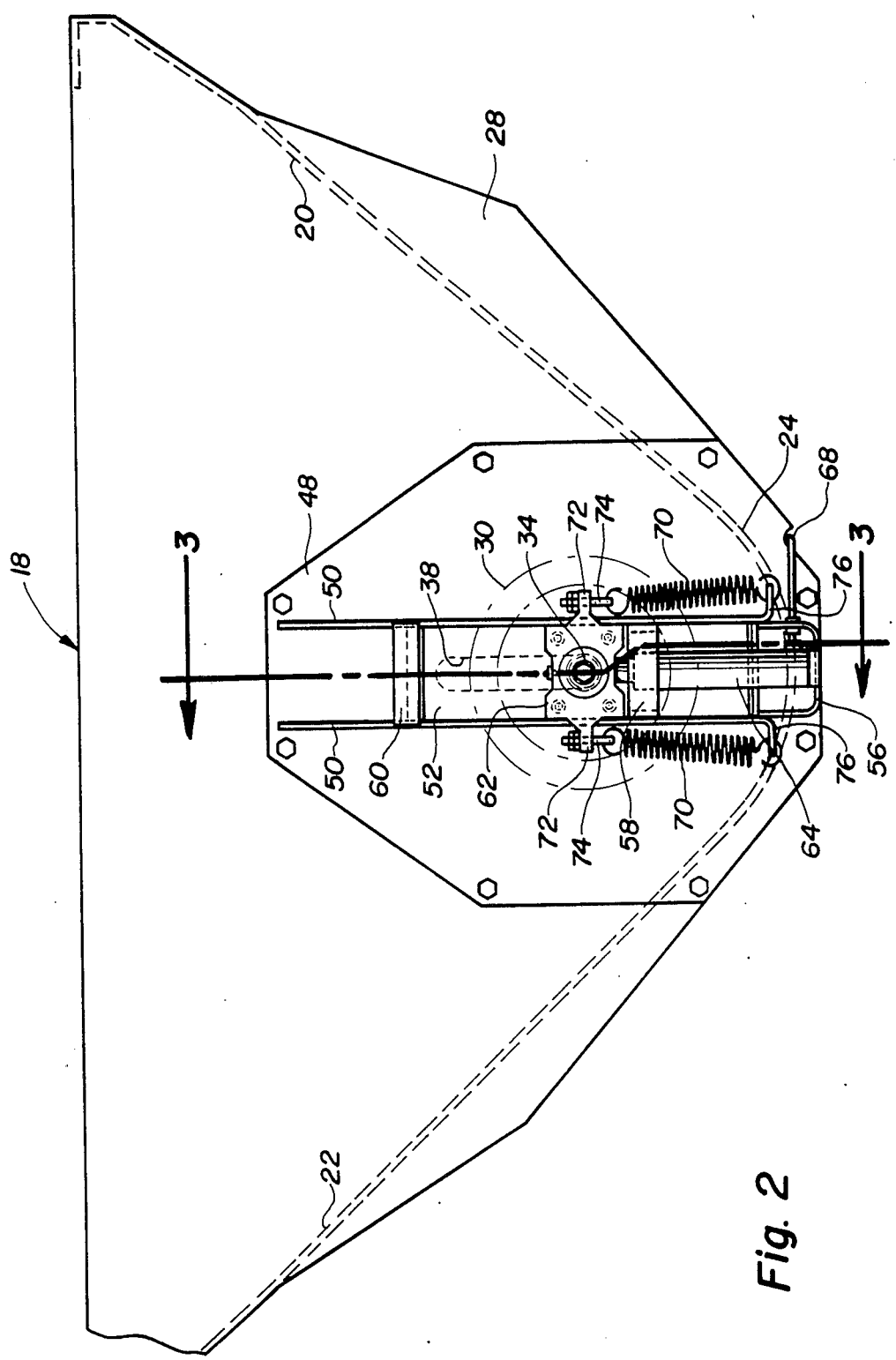
FIG. 2 is an enlarged rearward end view of part of the manure spreader of FIG. 1 taken along lines 2—2 in FIG. 1.

Referring generally to FIG. 1, a slurry type manure spreader 10 includes a base frame 12 supported by wheels 14. A tongue 16, partially shown, is provided at the forward end of the base frame 12 and is adapted for connection to a towing vehicle such as a tractor (not shown). A tank 18 for containing manure is mounted on the base frame 12, and the tank 18 includes sidewalls 20,22 converging or sloping toward each other and merging into a bottom wall 24 as seen in FIG. 2. The tank 18 also has endwalls 26,28 disposed substantially parallel to each other.

An auger 30 is rotatably mounted in the bottom of the tank 18. The auger 30 has stub shafts 32,34 at its ends extending through and slidably disposed in slots 36,38 formed in the endwalls 26,28 of the tank 18. Stub shaft 32 is adapted for connection to the PTO shaft (not shown) of the towing tractor. The auger 30 includes paddles 40 arranged in a pattern to move manure toward an opening 41 formed in the sidewall 20 of the tank 18 when the auger 30 is rotated by the tractor PTO shaft, and an expeller assembly 42 is provided at this opening 41 in the tank sidewall 20 to discharge manure laterally away from the spreader 10. The expeller assembly 42 includes a central shaft 44 which is driven via a chain and sprockets (not shown) from the stub shaft 32 of the auger 30. The expeller assembly 42 also includes a plurality of flails 46 pivotally mounted on further shafts which are connected to be rotated with the central shaft 44. The auger 30 is shown in FIG. 1 in its normal position in the tank 18 for moving manure toward the expeller assembly 42.

Figure 3:
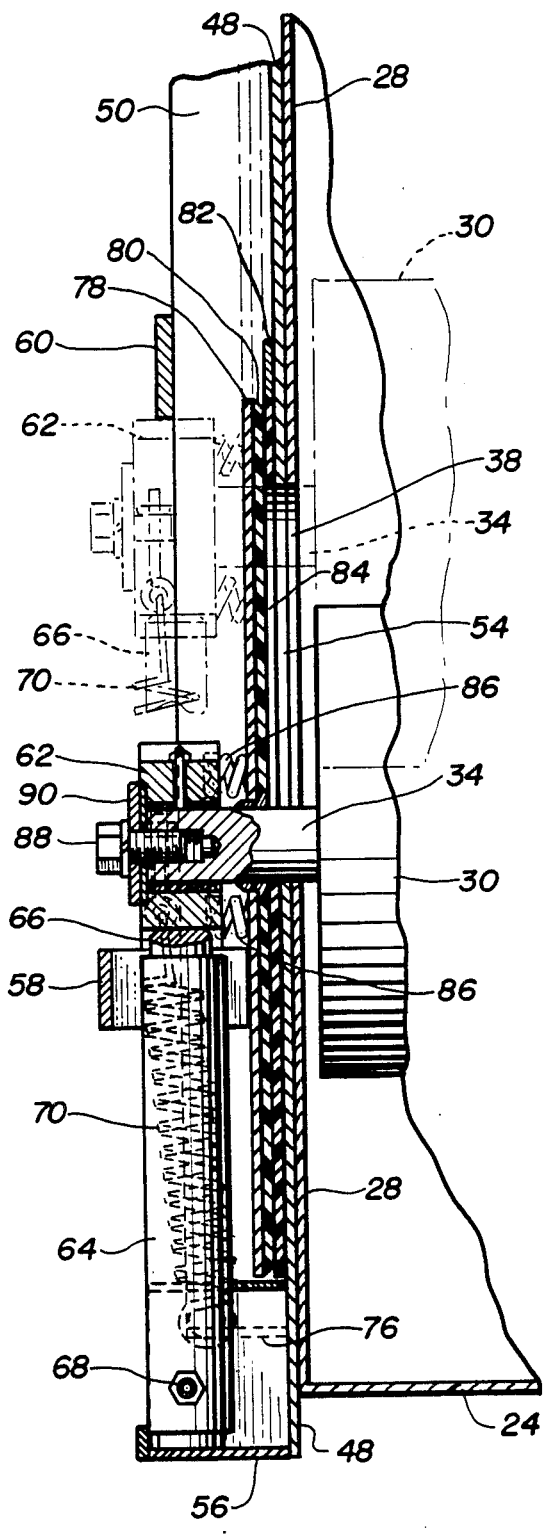
FIG. 3 is a further enlarged partial sectional view taken along lines 3—3 in FIG. 2.

As best seen in FIG. 2, a mounting plate 48 is bolted to each of the endwalls 26,28 of the tank 18. The mounting plates 48 each support a pair of guide members 50 spaced apart to define a channel 52 that is vertically elongated. Each of the mounting plates 48 includes a slot 54 formed therein, as seen in FIG. 3, which coincides with the slots 36,38 in the tank endwalls 26,28. A U-shaped bracket 56 is carried by each mounting plate 48 adjacent the lower ends of the guide members 50. Further brackets 58 and 60 are connected between the pairs of guide members 50 above the U-shaped brackets 56.

The auger stub shafts 32,34 are rotatably mounted by bearings in blocks 62 which in turn are slidably disposed in the channels 52 defined between the pairs of guide members 50. Power devices such as hydraulic cylinders 64 are supported by the brackets 56 and the pistons 66 disposed in the hydraulic cylinders 64 are arranged to contact, but are not fastened or secured to, the blocks 62. The hydraulic cylinders 64 are connected with a source of hydraulic power via conduits 68. Springs 70 are connected at their upper ends to ear portions 72 of the blocks 62 by eye bolts 74. The lower ends of the springs 70 are connected to portions 76 of the guide members 50. The springs 70 are of the coil type and are maintained in tension to normally urge the blocks 62 downwardly in the channels 52, thereby causing the auger 30 to be constantly urged downwardly in the tank 18. This prevents the auger 30 from floating upwardly in the tank 18 at inappropriate times.

Referring to FIG. 3, a cover plate 78 and a seal plate 80 are carried by bushings on each of the auger stub shafts 32,34 between the associated pair of guide members 50. The seal plates 80 are in sliding contact with other seal plates 82 which are fixed to the mounting plates 48. The seal plates 82 each have a slot 84 formed therein which coincides with the slots 36,38 in the tank endwalls 26,28 and with the slots 54 in the mounting plates 48. The seal plates 80 and 82 are formed of synthetic material such as plastic. Springs 86 are compressed between the blocks 62 and the cover plates 78 to urge the seal plates 80 into sealing engagement with the seal plates 82 to prevent leakage of manure from the tank 18. Fastening means such as a bolt 88 and a washer 90 are used to hold the blocks 62 on the auger stub shafts 32,34.

When it is desired by the operator to raise the auger 30 in the tank 18 from its normal position shown in FIG. 1, the hydraulic cylinders 64 are activated to extend the pistons 66 therefrom. The pistons 66 which are in contact with the blocks 62 raise them upwardly in the channels 52 against the force of the springs 70, and the auger stub shafts 32,34 slide upwardly in the slots 36,38 defined in the tank endwalls 26,28 as the auger 30 moves upwardly in the tank 18. The brackets 60 limit the upward movement of the blocks 62 and thus prevent the auger stub shafts 32,34 from engaging the upper ends of the slots 36,38 in the tank endwalls 26,28. When the operator desires to subsequently lower the auger 30 in the tank 18, the hydraulic cylinders 64 are deactivated and the springs 70 immediately pull the blocks 62 downward in the channels 52 and the auger 30 is quickly moved back downwardly to its normal position of FIG. 1. The brackets 58 limit the downward movement of the blocks 62 and thus prevent the auger stub shafts 32,34 from engaging the lower ends of the slots 36,38 in the tank endwalls 26,28.

The auger 30 is also permitted to move upwardly in the tank 18 against the force of the springs 70 independently of the hydraulic cylinders 64 when an obstruction such as a rock or a log becomes lodged between the auger paddles 40 and the bottom wall 24 of the tank 18. Again, the springs 70 immediately pull the auger 30 back downwardly to its normal position as soon as the obstruction is clear.

It will be understood that the springs 70, shown in FIGS. 1-3, may be replaced by leaf springs mounted between the ear portions 72 of the blocks 62 and additional brackets (not shown) which could be supported on the mounting plates 48 above the blocks 62.

The following claims are intended to cover all modifications and variations of the preferred embodiment of the invention without departing from the spirit and scope of the invention.

Having thus described the invention, what is claimed is:

1. A manure spreader comprising:
    a tank for containing manure, said tank having a pair of sidewalls, a bottom wall and a pair of endwalls;
    an auger extending between said pair of endwalls and having its ends rotatably mounted adjacent said pair of endwalls, said auger having stub shafts at its ends extending through and slidably disposed in slots formed in said pair of endwalls, said stub shafts being rotatably mounted in blocks which are slidably disposed between guide members attached to said endwalls, said auger having a normal position in said tank for moving manure toward an opening formed in one of said pair of sidewalls;
    expeller means disposed adjacent said opening to discharge manure from said tank;
    hydraulic cylinders mounted on said tank adjacent the ends of said auger for moving said auger from said normal position upwardly in said tank away from said bottom wall thereof, said auger also being movable from said normal position upwardly in said tank independently of said hydraulic cylinders; and
    springs connected to said blocks adjacent the ends of said auger for urging said auger downwardly in said tank toward said bottom wall thereof, said springs returning said auger to said normal position after said auger has been moved upwardly by said hydraulic cylinders and after said auger has been moved upwardly independently of said hydraulic cylinders.

2. The manure spreader of claim 1, wherein said springs constantly urge said auger downwardly in said tank.

3. The manure spreader of claim 2, wherein said springs are maintained in tension.

4. The manure spreader of claim 3, wherein said hydraulic cylinders have pistons arranged to contact said blocks without being fastened to said blocks.

* * * * *